(12) United States Patent
Lim et al.

(10) Patent No.: US 9,907,033 B2
(45) Date of Patent: Feb. 27, 2018

(54) COMMUNICATION METHOD AND APPARATUS FOR TERMINAL IN WIRELESS COMMUNICATION SYSTEM SUPPORTING CARRIER AGGREGATION

(71) Applicant: Samsung Electronics Co., Ltd, Gyeonggi-do (KR)

(72) Inventors: Chiwoo Lim, Gyeonggi-do (KR); Hyunseok Ryu, Gyeonggi-do (KR); Seunghoon Park, Seoul (KR); Peng Xue, Gyeonggi-do (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/512,520

(22) PCT Filed: Sep. 11, 2015

(86) PCT No.: PCT/KR2015/009553
§ 371 (c)(1),
(2) Date: Mar. 17, 2017

(87) PCT Pub. No.: WO2016/047945
PCT Pub. Date: Mar. 31, 2016

(65) Prior Publication Data
US 2017/0303214 A1 Oct. 19, 2017

Related U.S. Application Data

(60) Provisional application No. 62/055,232, filed on Sep. 25, 2014.

(30) Foreign Application Priority Data

Aug. 26, 2015 (KR) .................. 10-2015-0120274

(51) Int. Cl.
*H04W 52/38* (2009.01)
*H04W 72/12* (2009.01)

(52) U.S. Cl.
CPC .......... *H04W 52/38* (2013.01); *H04W 72/12* (2013.01)

(58) Field of Classification Search
CPC ... H04W 8/005; H04W 92/18; H04W 52/383; H04W 16/14; H04W 52/04; H04W 52/38
(Continued)

(56) References Cited

U.S. PATENT DOCUMENTS

2010/0050036 A1 2/2010 Chun et al.
2010/0081443 A1 4/2010 Meyer et al.
(Continued)

FOREIGN PATENT DOCUMENTS

EP 2665325 A1 11/2013
EP 2900022 A1 7/2015
(Continued)

OTHER PUBLICATIONS

Communication from Related Counterpart Application, U.S. Appl. No. 14/864,276, Non-Final Office Action dated Apr. 17, 2017, 10 pages.
(Continued)

*Primary Examiner* — Keith Ferguson

(57) ABSTRACT

The present invention relates to a 5G or pre-5G communication system which is to be provided to support high data throughput beyond a 4G communication system such as LTE. The communication method for a terminal in a wireless communication system supporting carrier aggregation according to the present invention comprises the steps of: confirming data transmission between different carriers is carried out on the basis of cellular and device-to-device (D2D) communication; reducing the transmission power for
(Continued)

a D2D communication-based data transmission to a configured value; and, if no cellular communication-based data transmission occurs during a set time, then restoring the reduced transmission power for the D2D communication-based data transmission.

14 Claims, 8 Drawing Sheets

(58) Field of Classification Search
USPC ........ 455/522, 69, 68, 500, 517, 445, 422.1, 455/403, 509, 450, 550.1, 426.1, 426.2, 455/434; 370/310, 312, 328, 329, 338, 370/337
See application file for complete search history.

(56) References Cited

U.S. PATENT DOCUMENTS

| | | |
|---|---|---|
| 2010/0177757 A1 | 7/2010 | Kim et al. |
| 2010/0222069 A1 | 9/2010 | Abraham et al. |
| 2011/0151887 A1 | 6/2011 | Hakola et al. |
| 2012/0188897 A1 | 7/2012 | Shen |
| 2013/0155962 A1 | 6/2013 | Hakola et al. |
| 2013/0178221 A1 | 7/2013 | Jung et al. |
| 2013/0308551 A1 | 11/2013 | Madan et al. |
| 2013/0322413 A1 | 12/2013 | Pelletier et al. |
| 2014/0112162 A1 | 4/2014 | Tavildar et al. |
| 2014/0141789 A1 | 5/2014 | Tarokh et al. |
| 2014/0233476 A1 | 8/2014 | Kwak et al. |
| 2015/0071272 A1 | 3/2015 | Vermani et al. |
| 2015/0110020 A1 | 4/2015 | Li et al. |
| 2015/0133132 A1 | 5/2015 | Li et al. |
| 2016/0073391 A1 | 3/2016 | Awad |
| 2017/0013640 A1 | 1/2017 | Loehr et al. |
| 2017/0245221 A1* | 8/2017 | Boudreau ............ H04W 52/242 |

FOREIGN PATENT DOCUMENTS

| | | | |
|---|---|---|---|
| WO | 2013181515 | A2 | 12/2013 |
| WO | 2013181807 | A1 | 12/2013 |
| WO | 2013181823 | A1 | 12/2013 |
| WO | 2014097224 | A1 | 6/2014 |
| WO | 2015138083 | A1 | 9/2015 |

OTHER PUBLICATIONS

Samsung, "Identifier in Scheduling Assignment for D2D Communication", R1-142107, 3GPP TSG RAN WG1 #77, Seoul, South Korea, May 19-23, 2014, 4 pages.
Qualcomm Incorporated, "Control for D2D Broadcast Communication", R1-141966, 3GPP TSG-RAN WG1 #77, Seoul, Korea, May 19-23, 2014, 8 pages.
Sharp, "D2D Network Coverage Definition & Mode Selection", R1-142208, 3GPP TSG RAN WG1 Meeting #77, Seoul, Korea, May 19-23, 2014, 2 pages.
3GPP TR 36.843 V12.0.1, "3rd Generation Partnership Project; Technical Specification Group Radio Access Network; Study on LTE Device to Device Proximity Services; Radio Aspects (Release 12)", Mar. 2014, 50 pages.
ZTE, "SA and Data Resource Allocation for Mode 1", R1-142232, 3GPP TSG-RAN WG1 Meeting #77, Seoul, Korea, May 19-23, 2014, 5 pages.
CATT, "Discussion on D2D Synchronization Sources", R1-142894, 3GPP TSG RAN WG1 Meeting #78, Dresden, Germany, Aug. 18-22, 2014, 4 pages.
CATT, "Resource Allocation for D2D Synchronization", R1-142892, 3GPP TSG RAN WG1 Meeting #78, Dresden, Germany, Aug. 18-22, 2014, 5 pages.
KDDI, "Discussion on Triggering Condition for D2DSS Transmission", R1-143159, 3GPP TSG RAN WG1 Meeting #78, Dresden, Germany, Aug. 18-22, 2014, 4 pages.
Ericsson, "On Scheduling Assignments and Receiver Behaviour", R1-141391, 3GPP TSG-RAN WG1 Meeting #76bis, Shenzhen, China, Mar. 31-Apr. 4, 2014, 6 pages.
International Search Report dated Dec. 17, 2015 in connection with International Application No. PCT/KR2015/009553, 5 pages.
Written Opinion of the International Searching Authority dated Dec. 17, 2015 in connection with International Application No. PCT/KR2015/009553, 6 pages.
International Search Report dated Feb. 17, 2016 in connection with International Application No. PCT/KR2015/010109, 3 pages.
International Search Report dated Nov. 17, 2015 in connection with International Application No. PCT/KR2015/008257, 3 pages.
International Search Report dated Mar. 18, 2016 in connection with International Application No. PCT/KR2015/010111, 4 pages.
Partial Supplementary European Search Report for European Application No. 15844060.2, dated Sep. 1, 2017, 11 pages.
Extended European Search Report for European Application No. 15844060.2, dated Dec. 19, 2017. (12 pages).

* cited by examiner

COMMUNICATION METHOD AND APPARATUS FOR TERMINAL IN WIRELESS COMMUNICATION SYSTEM SUPPORTING CARRIER AGGREGATION

CROSS-REFERENCE TO RELATED APPLICATION(S)

The present application claims priority under 35 U.S.C. § 365 to International Patent Application No. PCT/KR2015/009553 filed Sep. 11, 2015, entitled "COMMUNICATION METHOD AND APPARATUS FOR TERMINAL IN WIRELESS COMMUNICATION SYSTEM SUPPORTING CARRIER AGGREGATION", and, through International Patent Application No. PCT/KR2015/009553, to U.S. Provisional Application No. 62/055,232 filed Sep. 25, 2014, and to Korean Patent Application No. 10-2015-0120274 filed Aug. 26, 2015, each of which are incorporated herein by reference into the present disclosure as if fully set forth herein.

TECHNICAL FIELD

The present invention relates to a communication method and apparatus of a terminal in a wireless communication system supporting carrier aggregation.

BACKGROUND ART

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system.

Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive MIMO, Full Dimensional MIMO (FD-MIMO), array antenna, analog beamforming, and large scale antenna.

Also, in order to enhance network performance of the 5G communication system, developments are underway of various techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation.

Furthermore, the ongoing research is incorporating Advanced Coding Modulation (ACM) schemes such as a Hybrid FSK and QAM modulation and a Sliding Window Superposition Coding (SWSC) and advanced access technologies such as Filter Bank Multi Carrier (FBMC), Non-Orthogonal Multiple Access (NOMA), and Sparse Code Multiple Access (SCMA).

Recently, a direct inter-device communication technology has come into the spotlight. This technology, which is referred to as Device to Device (D2D) communication, is promising in licensed band communication systems such as a cellular communication system and unlicensed band communication systems such as a WLAN system. D2D communication is attractive in the mobile communication systems in terms of increasing traffic accommodation capability and reducing overload at a base station. That is, D2D communication is made in such a way that terminals (User Equipment (UE)) located in the same cell or neighboring cells are communicating through a D2D link established therebetween without the involvement of a base station (e.g., evolved Node B (eNB)), resulting in a reduction of the number of communication links from 2 to 1. Meanwhile, LTE systems use a Carrier Aggregation (CA) scheme to combine separate frequency resources for high speed communication, and the CA scheme may make it possible to use the legacy cellular communication and D2D communication simultaneously.

DISCLOSURE OF INVENTION

Technical Problem

The present invention provides a communication method and apparatus of a UE supporting carrier aggregation that is capable of improving the stability of cellular and/or D2D communication.

Also, the present invention provides a communication method and apparatus of a UE supporting carrier aggregation that is capable of combining a cellular communication and a D2D communication or combining multiple D2D communications. The different combinations may cause different problems; thus, there is a need of a method for overcoming the problems case by case. That is, various embodiments of the present invention propose a method capable of overcoming problematic situations caused by combinations of cellular and D2D communications in a CA environment.

Solution to Problem

In accordance with an aspect of the present invention, a communication method of a terminal in a wireless communication system supporting carrier aggregation includes checking data transmissions based on a cellular communication and a Device-to-Device (D2D) communication on different carriers; reducing transmission power for the D2D communication-based data transmission to a predetermined level; and recovering, when the cellular communication-based data transmission is absent during a predetermined period, the reduction in transmission power for the D2D communication-based data transmission.

In accordance with another aspect of the present invention, a terminal operating in a wireless communication system supporting carrier aggregation includes a transceiver for transmitting and receiving signals and at least one processor which checks data transmissions based on a cellular communication and a Device-to-Device (D2D) communication on different carriers; reduces transmission power for the D2D communication-based data transmission to a predetermined level; and recovers, when the cellular communication-based data transmission is absent during a predetermined period, the reduction in transmission power for the D2D communication-based data transmission.

In accordance with another aspect of the present invention, a communication method operating in a wireless communication system supporting carrier aggregation includes checking Device-to-Device (D2D) communication-based data transmissions over multiple carriers, determining priorities of the data transmissions or receptions based on D2D communication services provided on the respective carriers, and determining transmission power for D2D communication-based data transmission based on the priorities.

In accordance with still another aspect of the present invention, a terminal operating in a wireless communication system supporting carrier aggregation includes a transceiver for transmitting and receiving signals and at least one processor which checks Device-to-Device (D2D) communication-based data transmissions over multiple carriers, determines priorities of the data transmissions or receptions based on D2D communication services provided on the respective carriers, and determines transmission power for D2D communication-based data transmission based on the priorities.

Advantageous Effects of Invention

The communication method and apparatus of the present invention is advantageous in terms of facilitating both cellular and D2D communications by solving the problems occurring in a CA situation of aggregating cellular and D2D communication resources or D2D communication resources.

MODE FOR THE INVENTION

Figure 1:
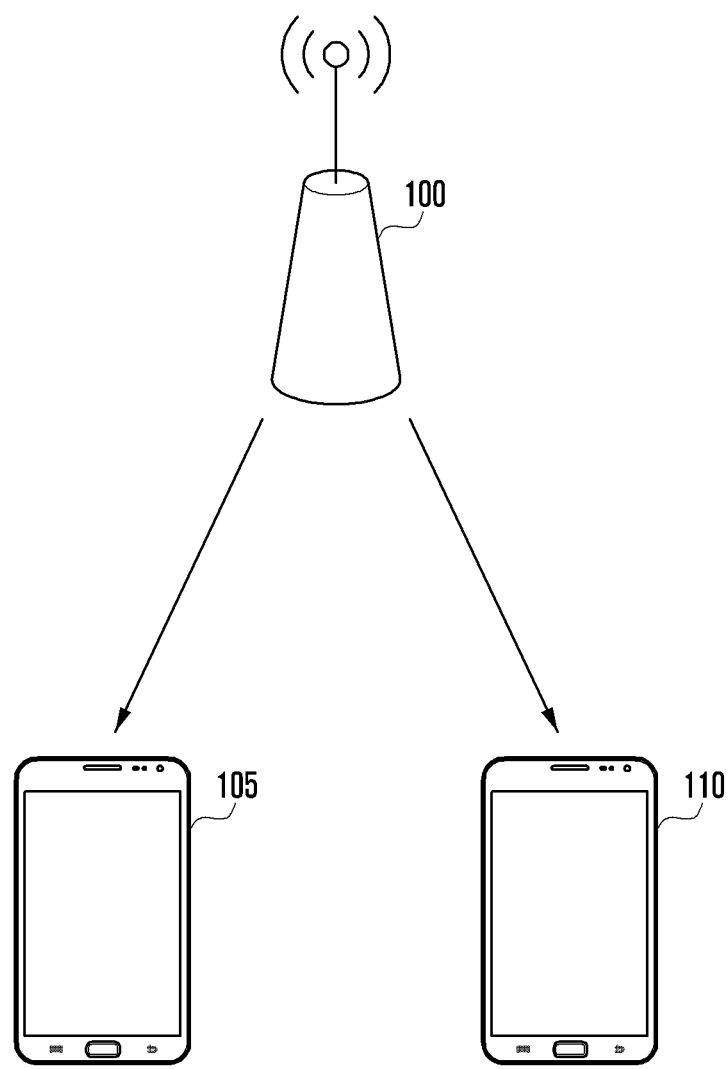
FIG. 1 is a diagram for explaining a D2D communication method in LTE.

Exemplary embodiments of the present invention are described with reference to the accompanying drawings in detail. Detailed descriptions of well-known functions and structures incorporated herein may be omitted to avoid obscuring the subject matter of the present invention. Further, the following terms are defined in consideration of the functionality in the present invention, and the definition may vary according to the intention of a user or an operator, usage, etc. Therefore, the definition should be made on the basis of the overall content of the present specification.

Before beginning the explanation of this invention, exemplary meanings of terms used in the following description are proposed. However, these exemplary meanings should not be understood to supersede other possible meanings. A LTE-based D2D communication technology is divided into two parts, called D2D discovery and D2D communication.

D2D discovery is a process in which a UE checks identities or interests of other UEs located closely or advertises its identity or interest to them. At this time, the identity and interest information may include a UE identifier (ID), an application identifier, or a service identifier, and they can be configured diversely depending on the D2D service and operation scenario.

D2D communication is a communication method of exchanging traffic between UEs without passing through any infrastructure such as an eNB or Access Point (AP). D2D communication may be performed based on the result of the D2D discovery procedure (i.e., with the discovered UEs) or without the D2D discovery procedure. Whether the D2D discovery procedure is required before D2D communication depends on the D2D service and operation scenario. The D2D service scenarios may be categorized into commercial service or non-public safety service and public safety service. The services may include an innumerable number of examples such as advertisement, Social Network Service (SNS), game, and public safety service.

Both D2D discovery and D2D communication are characterized by being performed in LTE uplink subframes. That is, a D2D transmitter transmits a D2D discovery signal and D2D communication data in an uplink subframe, and a D2D receiver receives them in the uplink subframe.

In current LTE systems, a UE receives data and control information from the eNB through downlink and transmits data and control information to the eNB through uplink, but the operation of the D2D transmitter/receiver is different in comparison with that of the legacy LTE transmitter/receiver. For example, the D2D function-enabled UE has an orthogonal frequency division multiplexing-based (OFDM-based) receiver to receive the downlink data and control information from the eNB and a single carrier-frequency division multiplexing-based (SF-FDM-based) transmitter to transmit uplink data and control information to the eNB. However, since the D2D UE has to support both the cellular mode and D2D mode, it has to have an extra SC-FDM receiver to receive the D2D data and control information in uplink as well as the OFDM-based receiver and the SC-FDM-based transmitter.

FIG. 1 is a diagram for explaining a D2D communication method in LTE.

The current LTE D2D defines two types of D2D discovery schemes according to the resource allocation scheme.

1) Type 1 discovery: The eNB 100 broadcasts information about uplink resource pools available for D2D discovery of D2D UEs (105, 110) located within the cell under its control using a System Information Block (SIB). At this time, the information may include a D2D resource size (e.g., x consecutive subframes) and a D2D resource interval (e.g., repeating every y seconds). Upon receipt of the information, the transmitting D2D UEs (e.g., UE 105) select the resources for use in transmitting D2D discovery signals in a distributed manner. Meanwhile, the receiving D2D UEs (e.g., UE 110) receive all D2D discovery signals transmitted in the resource pools indicated in the SIB.

2) Type 2 discovery: The eNB 100 notifies the receiving D2D UEs (e.g., UE 110) of the discovery resource pools using the SIB. Meanwhile, the eNB may allocate discovery signal resources to the transmitting D2D UEs (e.g., UE 105)

through a scheduling operation. At this time, the eNB may perform scheduling in a semi-persistent manner or a dynamic manner.

Similar to D2D discovery, D2D communication can be categorized into two modes according to the resource allocation scheme.

1) Mode 1: The eNB 100 notifies the transmitting D2D UE 105 of data transmission resources for D2D communication explicitly.

2) Mode 2: The eNB 100 notifies the transmitting D2D UE 105 of available resource pools such that the transmitting UE 105 selects resources within the resource pools for transmission.

D2D communication mainly aims to protect against unnecessary radio resource waste in adaptation to requirements of person-to-person, person-to-machine, and machine-to-machine communications and to provide the service appropriately in adaptation to the traffic occurring locally. Accordingly, research about D2D communication is focused on the methods for enhancing the D2D discovery procedure such that plural D2D devices broadcast and receive services and/or content information efficiently.

Meanwhile, LTE supports Carrier Aggregation (CA) for communication using plural frequency resources. The CA technology proposed in the present invention is applicable between a legacy cellular communication and a D2D communication. The proposed CA technology may also be applicable between D2D communications as well as between a legacy cellular communication and a D2D communication. In the following description, the base station is a counterpart communicating with a terminal and may be interchangeably referred to as BS, Base Transceiver Station (BTS), Node B (NB), eNodeB (eNB), and Access Point (AP).

In the following description, the terminal is a counterpart communicating with a base station and may be interchangeably referred to as User Equipment (UE), device, Mobile Station (MS), Mobile Equipment (ME), and subscriber terminal.

According to various embodiments of the present invention, the cases of thinkable pairs of a cellular (e.g., Wide Area Network (WAN)) communication (hereinafter, referred to as WAN communication for convenience of explanation) and a D2D communication are listed in Table 1.

TABLE 1

|        | Carrier 1 | Carrier 2 |
|--------|-----------|-----------|
| Case 1 | WAN TX    | D2D TX    |
| Case 2 | WAN TX    | D2D RX    |
| Case 3 | WAN RX    | D2D TX    |
| Case 4 | WAN RX    | D2D RX    |
| Case 5 | D2D TX    | D2D TX    |
| Case 6 | D2D TX    | D2D RX    |
| Case 7 | D2D RX    | D2D RX    |

In Table 1, the term "carrier" denotes a frequency on which a WLAN communication or a D2D communication is in progress. Although the table lists the cases of pairing two carriers, it should be noted that more than two carriers can be grouped.

In the case of pairing a WLAN/D2D communication mode and a D2D communication mode on different carriers as shown in Table 1, the CA operation may face different problems depending on the pair of communication types. Such problems may include a transmission power problem, a transmission timing problem, and a self-interference problem; descriptions are made of problematic situations per case and solutions according to various embodiments of the present invention.

Case 1 is the case where a UE transmits a WAN signal over carrier 1 and a D2D signal over carrier 2. In this case, the transmission power limit of the UE raises a problem of how to allocate the transmission power to the respective carriers. It may also bring a problem of how to solve the problems occurring when a WAN signal transmission timing mismatches a D2D signal transmission timing. Typically, the WAN transmission is considered to have a priority higher than that of the D2D transmission. For this reason, it may be assumed that the transmission power and transmission timing of a WAN signal is not affected by the D2D signal transmission. That is, the transmission power for D2D transmission should be determined in the residual power remaining after allocating the transmission power for WAN signal transmission. This may mean that the D2D signal transmission power should be lowered. In this case, a problem to be considered is how temporary power reduction should be performed. The following approaches may be considered:

1. To perform power reduction during a time duration overlapped with WAN signal transmission
2. To perform power reduction during a subframe overlapped with WAN signal transmission
3. To perform power reduction during a period of consecutive subframes including a subframe overlapped with WAN signal transmission
4. To perform power reduction during all D2D subframes or a predetermined number of D2D subframes Method 1 is advantageous in terms of the least affect to the D2D signal transmission, but it is disadvantageous in terms of difficulty of per-symbol power control and mismatch between WAN and D2D signal transmission timings.

Method 2 considers the difficulty of the per-symbol power control of method 1 and is preferable when the mismatch of WAN and D2D signal transmission timings is small. However, if the D2D signal transmission is performed without use of Time Adjustment (TA) in WAN uplink (UL) (e.g., D2D signal transmission may follow WAN UL TA or WAN DL timing). Method 3 is a method for reducing the transmission power of the D2D signal during the two subframes in consideration of the WAN signal transmission and TA of the WAN signal transmission. In reference to FIG. 2, in the case where WAN UL transmission (Tx) and D2D Tx are in progress, the UL TA is applied to the WAN UL Tx while the DL timing is applied to the D2D Tx.

Figure 2:
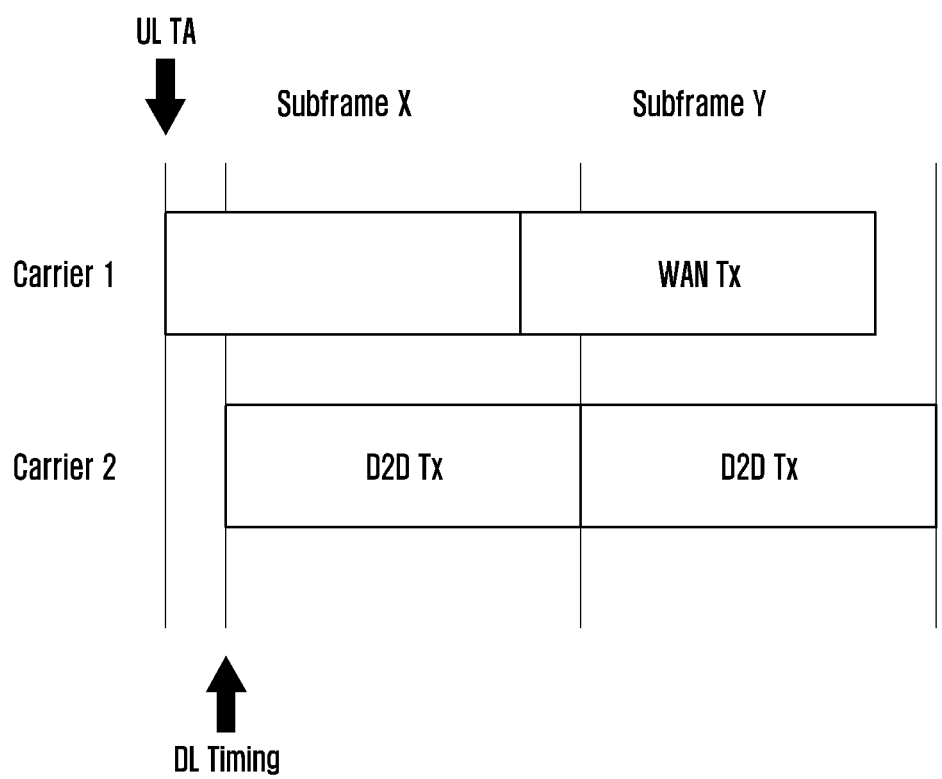
FIG. 2 is a diagram illustrating a UE operation of performing cellular and D2D transmissions on different frequency resources at different transmission timings.

As shown in FIG. 2, if the WAN UL Tx follows the UL TA and the D2D Tx follows the DL timing, it may be necessary to perform power reduction in subframe X as well as subframe Y for D2D transmission.

Figure 3:
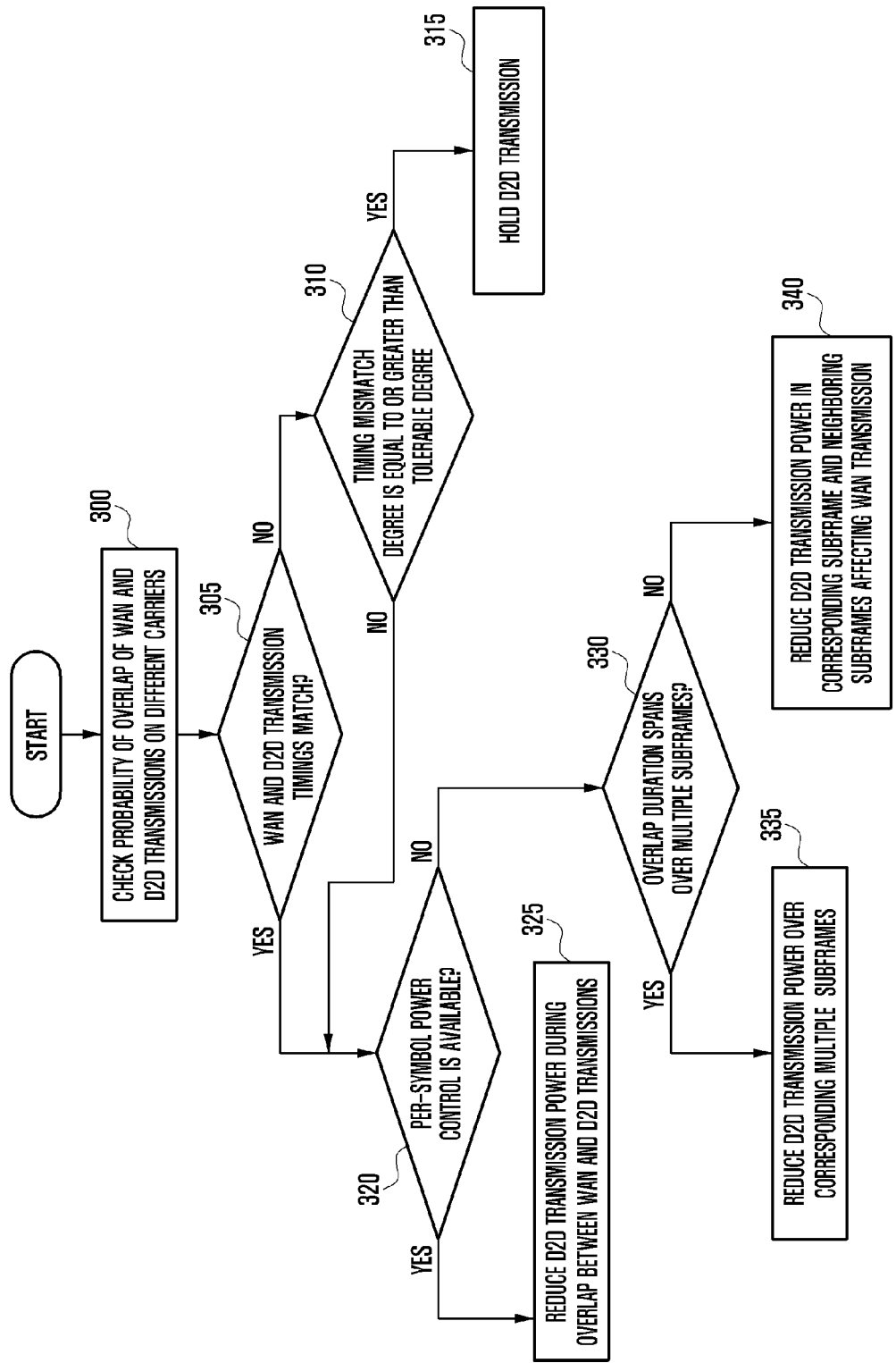
FIG. 3 is a flowchart illustrating a procedure for a UE to perform a cellular transmission and a D2D transmission using multiple frequency resources according to an embodiment of the present invention.

FIG. 3 is a flowchart illustrating a procedure for a UE to perform a WAN transmission and a D2D transmission over multiple frequency resources based on methods 1 to 3.

The UE may check a probability of a temporal overlap of a WAN Tx and a D2D Tx on different carriers at step 300. For example, the UE may check whether a WAN Tx and a D2D Tx are overlapped based on scheduling information.

The UE may determine at step 305 whether the transmission timings of the WAN Tx and the D2D Tx match. If the transmission timings mismatch, the UE determines at step 310 whether the mismatch degree is equal to or greater than a tolerable degree. The tolerable degree may be a predetermined time value. If the mismatch degree is equal to or greater than the tolerable degree, the UE may hold the D2D Tx at step 315 because the D2D Tx in the state that the mismatch degree is greater than the tolerable degree may break the orthogonality of the WAN Tx signal.

Otherwise, if the transmission timings of the WAN Tx and D2D Tx match or if the mismatch degree between the WAN Tx and the D2D Tx is less than the tolerable degree, the UE may determine at step 320 whether per-symbol transmission power control is available. If so, the UE may perform D2D transmission power reduction during the overlap of the WAN Tx and the D2D Tx at step 325.

If the per-symbol transmission power control is not available, the UE determines at step 330 whether the WAN Tx and the D2D Tx overlap spans over multiple subframes. If the WAN Tx and the D2D Tx overlap spans over multiple subframes, the UE may perform the D2D Tx power reduction over the multiple subframes at step 335. If the WAN Tx and the D2D Tx do not overlap across multiple subframes, the UE may perform the D2D Tx power reduction for the neighboring subframes affecting the WAN Tx as well as the corresponding subframe at step 340.

According to an embodiment, the reduced D2D transmission power should be equal to or less than the power remaining after subtracting the WAN transmission power from the total allowed transmission power.

Method 4 is a method for overcoming difficulties encountered in performing D2D transmission power control promptly in adaptation to a real WAN scheduling environment in all of the methods 1, 2, and 3 in which the D2D transmission power should be adjusted according to the WAN UL Tx situation. Accordingly, the method 4 proposes a concept of predetermining the D2D transmission power value in a multi-carrier D2D situation regardless of the WAN UL Tx condition.

Furthermore, such D2D transmission power reduction may not be performed during a period in which no WAN UL transmission is expected for a long time. For example, considering that the WAN UL transmission is triggered based on Scheduling Request (SR) of the UE, if the UE has not transmitted an SR for WAN transmission to the eNB, it may not perform the D2D transmission power reduction. It may also be possible for the eNB to allocate WAN transmission resources to the UE at a time outside the D2D transmission period to avoid performing D2D transmission power reduction.

Meanwhile, if the D2D Tx follows a DL timing rather than the WAN UL TA which the WAN Tx follows and if the time difference is equal to or greater than a predetermined value, the D2D transmission may be held because the orthogonality of WAN transmission signals may be broken. Also, if the UE does not support multiple TAs, it may hold D2D transmission.

Figure 4:
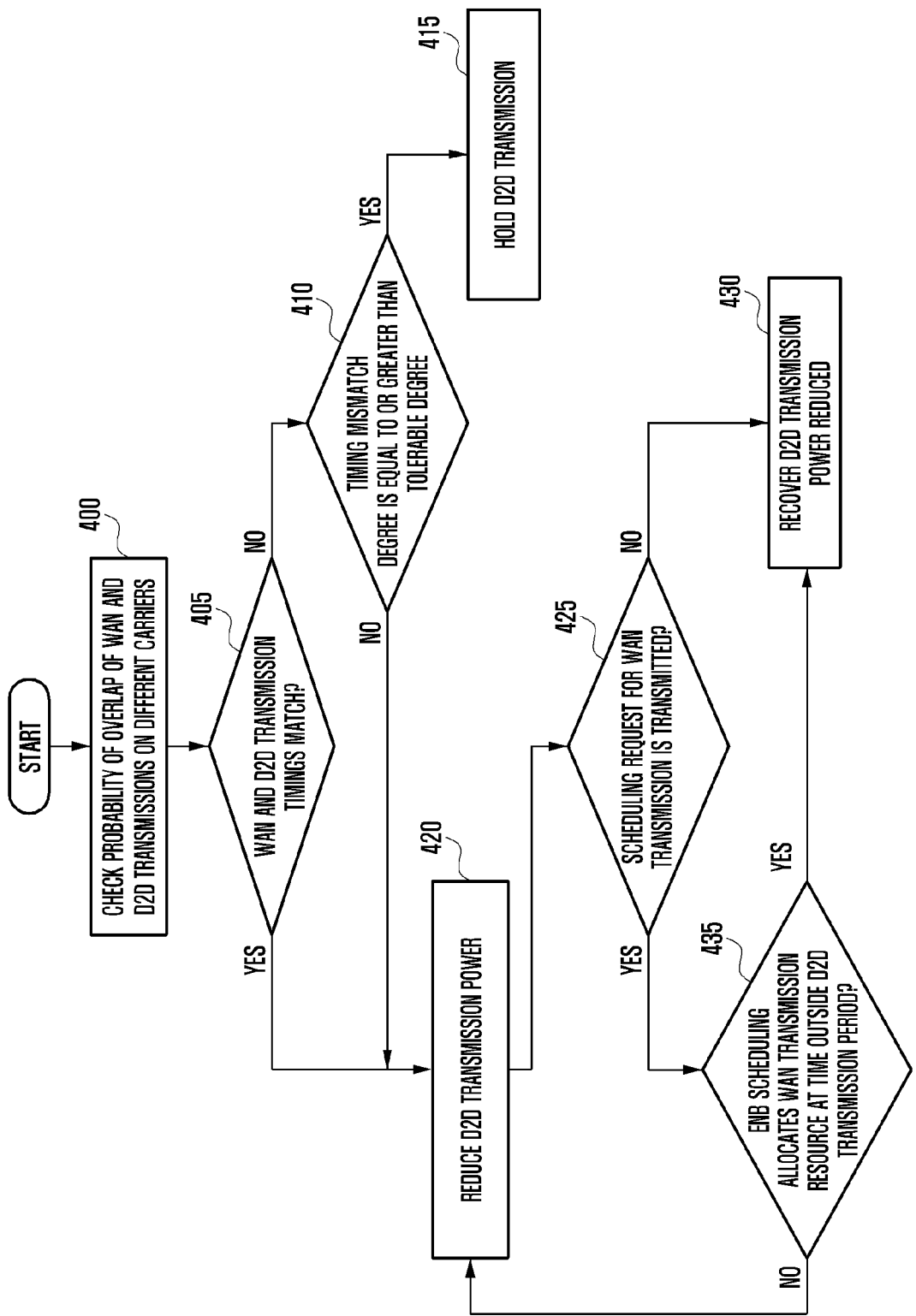
FIG. 4 is a flowchart illustrating a procedure for a UE to perform a cellular transmission and a D2D transmission using multiple frequency resources according to another embodiment of the present invention.

FIG. 4 is a flowchart illustrating a procedure for a UE to perform a WAN transmission and a D2D transmission over multiple frequency resources based on method 4.

The UE may check a probability of a temporal overlap of a WAN Tx and a D2D Tx on different carriers at step 400. For example, the UE may check whether a WAN Tx and a D2D Tx are overlapped based on scheduling information.

The UE may determine at step 405 whether the transmission timings of the WAN Tx and the D2D Tx match. If the transmission timings mismatch, the UE determines at step 410 whether the mismatch degree is equal to or greater than a tolerable degree. The tolerable degree may be a predetermined time value. If the mismatch degree is equal to or greater than the tolerable degree, the UE may hold the D2D Tx at step 415 because the D2D Tx in the state that the mismatch degree is greater than the tolerable degree may break the orthogonality of the WAN Tx signal.

Otherwise, if the transmission timings of the WAN Tx and D2D Tx match or if the mismatch degree between the WAN Tx and the D2D Tx is less than the tolerable degree, the UE may perform D2D transmission power reduction at step 420. According to various embodiments, if it is detected that the WAN Tx and the D2D Tx are performed using multiple frequency resources, the UE may perform the D2D transmission power reduction regardless of the overlap between the WAN Tx and the D2D Tx.

During the D2D transmission power reduction, the UE may determine at step 425 whether a scheduling request for WAN Tx is transmitted to the eNB. If no scheduling request for WAN Tx is transmitted, this means that no WAN Tx is performed; thus, the UE may recover at step 430 the reduction in D2D transmission power. According to various embodiments, the UE may recover the reduction in D2D transmission power when no scheduling request for WAN Tx is transmitted during a predetermined period. If a scheduling request for WAN Tx is transmitted afterward, the UE may perform the D2D transmission power reduction again.

If a scheduling request for WAN Tx is transmitted to the eNB, the UE may determine at step 435 whether the eNB scheduling allocates WAN Tx resources at a time outside the D2D transmission period. If the eNB scheduling allocates WAN Tx resources at a time within the D2D transmission period, the UE maintains the D2D transmission power reduction; otherwise if the eNB allocates WAN Tx resources at a time outside the D2D transmission period, the UE may recover at step 430 the reduction in D2D transmission power. For example, the eNB may send the UE a signal notifying that the WAN Tx resources are allocated at a time outside the D2D Tx period in response to the SR from the UE. If this notification is received from the eNB, the UE may recover the reduction in D2D transmission power.

Case 2 is the case where the UE transmits a WAN signal over carrier 1 and receives a D2D signal over carrier 2. In this case, a WAN signal component transmitted by the UE may be mixed with the D2D Rx signal (self-interference problem, full duplexing problem, etc.). If a carrier for WAN communication and a carrier for D2D transmission lie in the same frequency band, the WAN Tx signal may affect the D2D Rx signal. Accordingly, it is necessary to adjust the WAN signal transmission power or to arrange the WAN Tx carrier and the D2D Rx to keep a predetermined distance for the case 2 operation.

If the WAN Tx has a priority higher than that of the D2D Rx, it is difficult to consider WAN Tx power reduction and, in this case, it is preferable to rule out a multicarrier operation with a D2D carrier. However, the WAN Tx power may be adjusted in the same frequency band (according to power control (PC) in the WAN) and, in this case, it may be possible to consider a multicarrier D2D. Although it is likely that the WAN Tx does not affect the D2D Rx when they are performed in different frequency bands, it may be possible to predetermine the CA combinations available for the multicarrier D2D operation to guarantee non-interference.

Case 3 is the case where the UE receives a WAN signal over carrier 1 and transmits a D2D signal over carrier 2. This is similar to the operation in the FDD mode of the legacy WAN communication system and can be performed without any problem.

Case 4 is the case where the UE receives a WAN signal over carrier 1 and a D2D signal over carrier 2. In this case, the operation is determined depending on the type of the D2D signal. It may be possible to assume that simultaneous reception is available for the D2D communication for public safety and that it is not available for the D2D discovery for non-public safety. In this case, if the priorities of the operations and the UE capabilities are determined, there is no special issue.

Cases 5 to 7 to be described hereinafter relate to the problems occurring in the case of transmitting or receiving signals over multiple frequencies and solutions to solve the problems. The D2D signal transmission over multiple frequencies may raise a transmission power control problem, and D2D signal transmission and reception over multiple frequencies may raise a self-interference problem. Also, the D2D signal reception over multiple frequencies may raise a reception timing problem because the UE has one reception module.

According to an embodiment of the present invention, if the UE transmits or receives D2D signals over multiple frequencies, it is necessary to determine the priority per D2D communication and D2D transmission power per priority. The priority of the D2D communication is determined based on the purpose of the D2D communication service provided over each carrier or the signaling of the eNB. It may be possible to allocate a high transmission power for the D2D communication with a high priority. However, the transmission power should be determined in a given total transmission power range.

According to an embodiment of the present invention, if the UE receives D2D signals over multiple frequencies, it may be possible to configure the UE to receive the D2D signals transmitted over different carriers at different timings or to determine the priorities of the D2D communications and receive the D2D signal with a high priority first.

Cases 5 to 7 are described in detail hereinafter.

Case 5 is the case where the UE transmits a D2D signal over carrier 1 and transmits a D2D signal over carrier 2 simultaneously. This is the case of performing D2D transmission over multiple carriers in the following scenarios.

D2D communication services can be categorized into a public safety service and a non-public safety service. Performing services per carrier may be considered. Typically, a public safety service has a priority higher than that of a non-public safety service. In this case, it is necessary to give a priority on allocating the restricted transmission power to the carrier for use of the public safety service. Unlike the combinations of WAN and D2D communications, a combination of two D2D communication is characterized in that the D2D transmission power for a public safety service with a high priority may be adjusted in part. The UE may determine the transmission power per carrier based on a predetermined value or a value indicated in an SIB or a dedicated RRC signal from the eNB. For example, the predetermined value or the value received from the eNB may include D2D transmission power information per priority or per D2D service.

In another scenario, it may be possible to consider a case where a dedicated public safety carrier exists. The dedicated public safety carrier may be a carrier for providing public safety service through the D2D communication transparently of the communication operator. It may be possible for all UEs to perform a D2D communication for a public safety service through the corresponding carrier. In this case, it may be determined that the communication over the dedicated public safety carrier is performed with priority in comparison with the communication over a D2D carrier of a subscribed communication operator (however, if the eNB notifies that the carrier of the subscribed communication operator has the priority, the UE may give priority to the corresponding carrier.). Even in this case, the UE needs to adjust the D2D transmission power per carrier based on the predefined value or a value received from the eNB through a signaling (SIB or dedicated RRC signaling).

For the period during which such power control is performed, the four approaches of case 1 may be applied. However, the WAN transmission with priority in case 1 may be regarded as the dedicated public safety or public safety signal transmission in the D2D communication.

Meanwhile, the D2D communication technology is divided into D2D communication and D2D discovery and, typically, D2D communication is used for public safety purposes and D2D discovery is used for non-public safety purposes. Since D2D communication and discovery signals may be transmitted at different transmission timings (based on UL TA or DL timing), there is a need to define transmission timings for such a case. For example, the public safety communication is likely to have a relatively high priority, and it is preferable to configure the transmission timing on the corresponding carrier with priority. Accordingly, if the difference between the non-public safety service signal transmission timing and the public safety service signal transmission timing is equal to or greater than a predetermined value, it may be possible to not transmit the non-public safety service signal.

Figure 5:
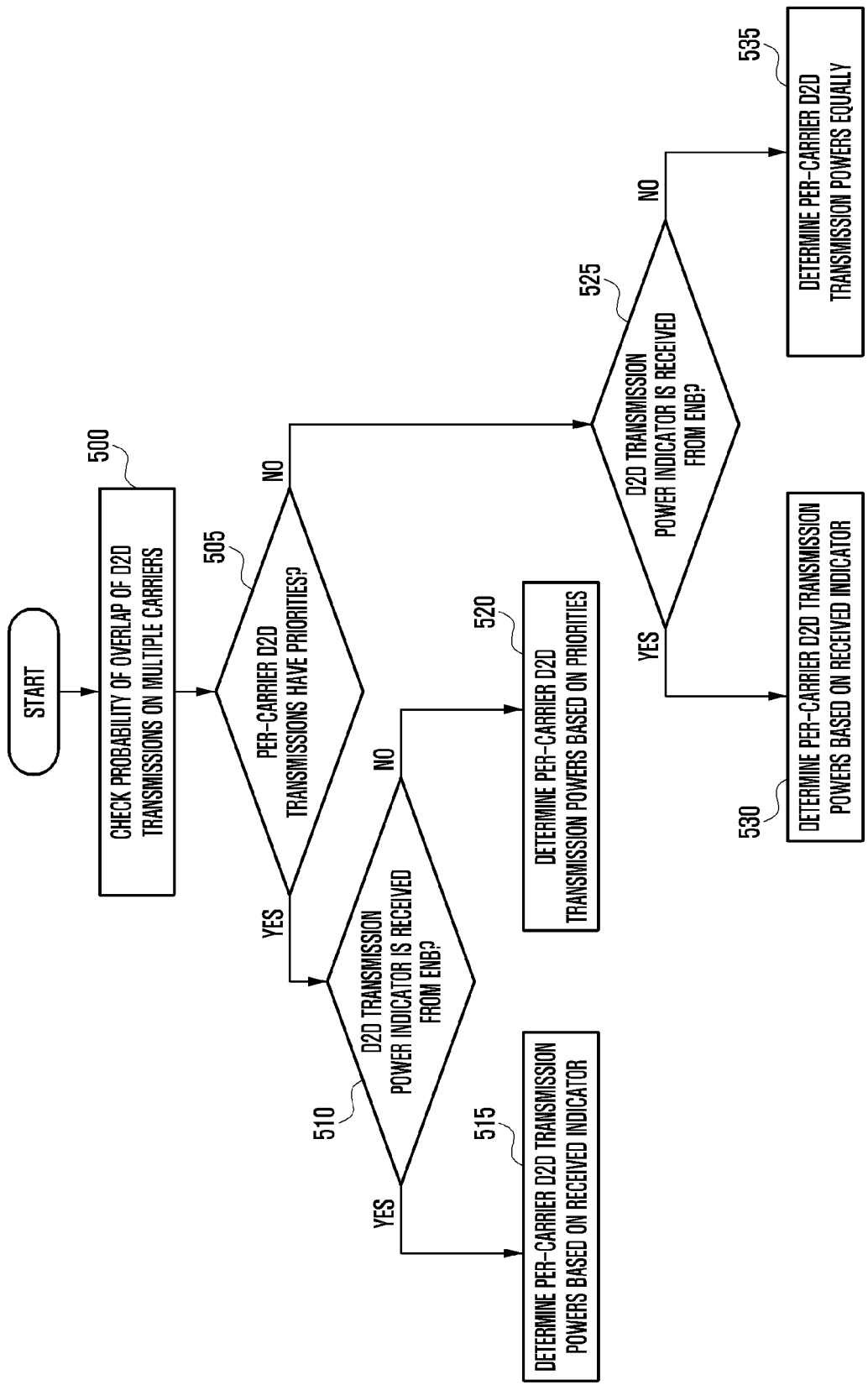
FIG. 5 is a flowchart illustrating a procedure for a UE to perform D2D transmission using multiple frequency resources according to an embodiment of the present invention.

FIG. 5 is a flowchart illustrating a procedure for a UE to perform D2D transmission over multiple frequency resources based on case 5.

The UE may check a probability of a temporal overlap of D2D transmissions on multiple carriers at step 500. For example, the UE may check whether D2D transmissions over multiple carriers are overlapped based on scheduling information.

The UE may determine at step 505 whether the per-carrier D2D transmissions have priorities. As discovered above, the priority may be determined based on the purpose of the D2D communication service provided through the carrier or according to a signal transmitted by the eNB.

If the per-carrier D2D transmissions have priorities, the UE may determine at step 510 whether a D2D transmission power indicator is received from the eNB. If the D2D transmission power indicator is received from the eNB, the UE may determine at step 515 per-carrier D2D transmission powers according to the priorities based on the D2D transmission power indicator. The indicator may include D2D transmission power information per priority or per D2D service. If no D2D transmission power indicator is received, the UE may determine per-carrier D2D transmission powers based on the priorities at step 520. For example, the UE may determine per-carrier D2D transmission powers according to the priorities based on the predetermined transmission power information or calculate the per-carrier transmission powers according to the priorities based on the restricted total transmission power. At this time, the higher the priority of the D2D transmission, the higher the transmission power that is allocated.

If the per-carrier D2D transmissions have no priority, the UE may determine at step 525 whether a D2D transmission power indicator is received from the eNB. If the D2D transmission power indicator is received from the eNB, the UE may determine at step 530 the per-carrier D2D transmission powers based on the indicator. For example, the indicator may include D2D transmission power information per carrier or per D2D service purpose. If no D2D transmission power indicator is received from the eNB, at step 535 the UE may configure all the per-carrier D2D transmission powers at the same level.

Case 6 is the case where the UE transmits a D2D signal over carrier 1 and receives a D2D signal over carrier 2. In this case, three scenarios can be considered as follows.

Scenario 1: Two D2D carriers are allocated in the Public Land Mobile Network (PLMN) of the UE.

Scenario 2: A D2D carrier is allocated in the PLMN of the UE and a dedicated D2D carrier is additionally allocated regardless of the PLMN.

Scenario 3: One D2D carrier is allocated in one PLMN and the UE wants to receive D2D signals in another PLMN.

Scenario 1 is a case where two D2D carriers, one for D2D signal transmission and the other for D2D signal reception, are allocated in the same PLMN and, in this case, the transmission signal affects the reception signal (self-interference problem in case 2). The operation to be performed is determined depending on the purposes of the D2D services provided on the respective carriers. If the D2D Tx signal is a public safety service signal and the D2D Rx signal is a non-public safety service signal, it is not preferable to perform power reduction on the transmission signal because the public safety service has a priority higher than that the non-public safety service. Otherwise, if the D2D Tx signal is a non-public safety service signal and the D2D Rx signal is a public safety service signal, it is preferable to perform power reduction on the transmission signal. In this case, the transmission power of the D2D Tx may be determined so as not to affect the D2D Rx in consideration of the distance between the carriers. For example, the transmission power of the D2D Tx may be adjusted to a level capable of receiving the D2D Rx signal over the other carrier (e.g., level which does not make the Signal-to-Noise Ratio (SINR) of the D2D Rx signal become less than the SINR corresponding to the Modulation & Coding Scheme (MCS) of the Rx signal). The transmission power value may be predetermined or indicated in the information received from the eNB such as an SIB.

In the case that multiple D2D communications are in progress in the same PLMN, differentiation between per-carrier D2D communication time durations (e.g., transmission durations and reception durations) may be considered to solve the problem. Scenario 2 is the case where the UE performs a communication over a D2D carrier of its PLMN and a communication over a dedicated D2D communication regardless of the PLMN. In this case, the operation over the dedicated D2D carrier has a higher priority because the dedicated D2D carrier is reserved for public safety services (however, if the eNB notifies that the PLMN carrier has priority, the communication priority should be determined in consideration of the priority notification). The UE gives priority to the operation on the carrier with the higher priority. For example, if the operation on the carrier with the higher priority is the transmission operation, the UE may adjust the transmission power (e.g., performing no power reduction or performing power reduction to an ignorable extent); and if the operation on the carrier with the higher priority is the reception operation, the UE may adjust the transmission power on the carrier with the transmission operation to an extent so as not to affect the reception operation. The transmission power may be adjusted using a predetermined value or a value contained in a signal such as an SIB from the eNB.

Scenario 3 is the case where the UE is transmitting a D2D signal over a carrier of its serving PLMN and receiving a D2D signal over a carrier of another PLMN. This situation can be considered under the assumption that the UE can receive a D2D signal over a carrier of the non-serving PLMN and, in this case, it is important to prevent the D2D Tx signal from interfering with the D2D Rx signal on the carrier of the non-serving PLMN. Even in this case, it may be important to perform the operation in consideration of the priorities of the D2D communication services provided on the respective PLMN carriers. If the D2D transmission over the carrier of the serving PLMN is associated with a non-public safety service while the D2D reception over the carrier of the non-serving PLMN is associated with a public safety service, the UE may adjust the transmission power for the D2D transmission operation. In this case, the power control parameters may be predetermined values or values received from the eNB through an SIB or dedicated RRC signaling.

Figure 6:
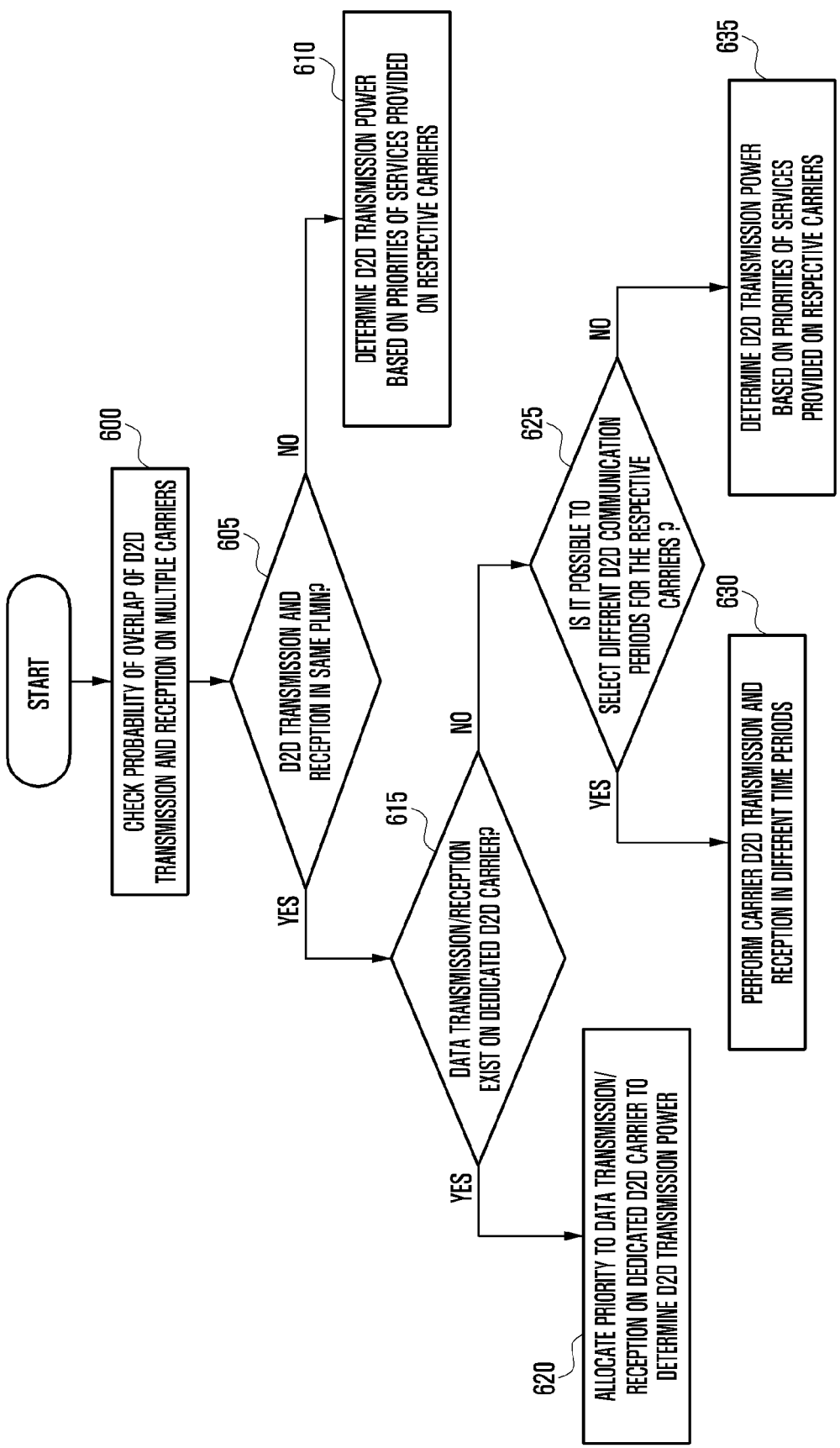
FIG. 6 is a flowchart illustrating a procedure for a UE to perform D2D transmission and reception using multiple frequency resources according to an embodiment of the present invention.

FIG. 6 is a flowchart illustrating a procedure for a UE to perform D2D transmission and reception on multiple frequency resources based on case 6.

The UE may check a probability of a temporal overlap of D2D transmission and reception on multiple carriers at step 600. For example, the UE may check whether a D2D transmission and a D2D reception are overlapped based on scheduling information.

The UE may determine at step 605 whether the D2D transmission and the D2D reception are performed through the same PLMN. If the D2D transmission and reception are not performed through the same PLMN, the UE may determine the D2D transmission power based on the priorities of the per-carrier services at step 610. For example, if the data communications are performed through different PLMNs, a public safety service signal may have a priority higher than that of the non-public safety service signal.

If the D2D transmission and the D2D reception are performed through the same PLMN, the UE may determine at step 615 whether a dedicated D2D carrier (e.g., public safety carrier) is in use for data communication. If a dedicated D2D carrier is in use for data communication, the UE may assign at step 620 a higher priority to the D2D communication on the dedicated D2D carrier than that of the D2D communication on its serving PLMN and determine the D2D transmission power based on the priority.

If no dedicated D2D carrier is in use for data communication, the UE may determine at step 625 whether it is possible to select different D2D communication periods for the respective carriers. If so, the UE may select different D2D communication periods for the respective carriers to perform D2D communications at step 630. In this case, the D2D data transmission and reception timings are not overlapped so as to avoid transmission power problems and interference problems. If it is impossible to select different D2D communication periods, the UE may determine the D2D transmission power based on the per-carrier services to perform the D2D communications. For example, the public safety service signal is likely to have a priority higher than that of the non-public safety service signal.

Figure 7:
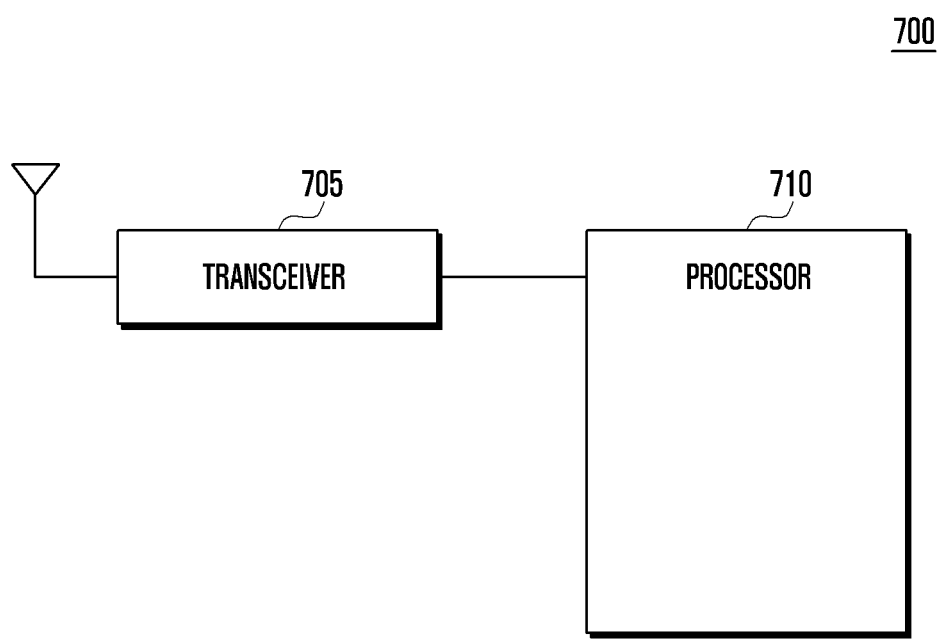
FIG. 7 is a block diagram illustrating a schematic configuration of a UE according to an embodiment of the present invention.

Case 7 is the case where the UE receives D2D signals over carrier 1 and carrier 2. Typically, assuming that one UE has one D2D reception module, it is difficult for the UE to receive D2D signals on multiple carriers. In order to solve this problem, differentiation between the D2D signal reception timings on the respective carriers and switching one D2D reception module between the two carriers to receive the D2D signals may be considered. This scenario can be thought of as an inter-PLMN issue and, in this case, the problem can be solved by configuring different D2D operation timings for the respective PLMNs. If the D2D operations on the respective carriers have priorities, the UE may receive the D2D signal having the higher priority first. In this case, the UE has to have the information on the priorities of D2D operations on the respective carriers, the priority being determined on the D2D communication services or signaling from the eNB. The eNB may notify the UE of the types of services provided on the respective carriers or transmit a per-carrier priority indicator to the UE for multicarrier operation. FIG. 7 is a block diagram illustrating a schematic configuration of a UE supporting carrier aggregation according to an embodiment of the present invention. The UE 700 may include a transceiver 705 and at least one processor 710.

The transceiver 705 may communicate signals with an eNB or another D2D UE under the control of the processor 710. As described above, the UE 700 according to an embodiment of the present invention may include an SC-FDM receiver for receiving D2D data and control information in uplink as well as an OFDM receiver and an SC-FDM transmitter for LTE operations.

The processor 710 may control the transceiver 705 to perform WAN and D2D data communications on different frequencies.

According to an embodiment, the processor 710 may check WAN and D2D data communications on different carriers and perform power reduction on the transmission power for the D2D data communication to a preconfigured value. If no data transmission is present on the WAN carrier during a predetermined period, the processor 710 may recover the reduction in transmission power for the D2D data communication.

If a scheduling request for WAN transmission is not transmitted, the processor 710 may recover the reduction in transmission power for the D2D transmission. If WAN transmission resources are allocated at a time outside the D2D transmission period in response to a scheduling request, the processor 710 may recover the reduction in transmission power for the D2D transmission. The eNB may transmit a signal to the UE 700 to notify that the WAN transmission resources are allocated at the time outside the D2D transmission period in response to the scheduling request.

If the D2D transmission does not follow the WAN UL TA, the processor 710 determines whether the time difference between the WAN transmission time and the D2D transmission time is equal to or greater than a tolerable level and, if so, the processor 710 may hold the D2D transmission. If the D2D transmission does not follow the WAN UL TA, the processor 710 may determine whether the UE 700 supports use of multiple TAs and, if not, hold the D2D transmission.

According to an embodiment, the processor 710 may check D2D data transmission and D2D data reception on multiple carriers and priorities of the D2D data transmission and reception based on the types of the D2D communication services provided on the carriers and determine the D2D data transmission power based on the priorities. The D2D communication services include a dedicated public safety service D2D communication, a public safety service D2D communication, and a non-public safety service D2D communication prioritized in descending order. If the priority order information is received from the eNB, the processor 710 may prioritize the data transmission and reception based on the priority order information.

The processor 710 may determine the data transmission power based on the priority order information as well as predetermined transmission power information or transmission power information received from the eNB.

The processor 710 may perform the D2D transmission at the determined power level during the period as described for 4 methods in case 1.

The processor 710 may determine the D2D transmission power in consideration of the influence to the D2D reception operation based on the priority order. If the D2D communication is performed on multiple carriers of the same PLMN, the processor 710 may adjust the data transmission or reception timings based on the priority order.

According to various embodiments of the present invention, the processor 710 may perform the UE control operations as described for cases 1 to 7.

Figure 8:
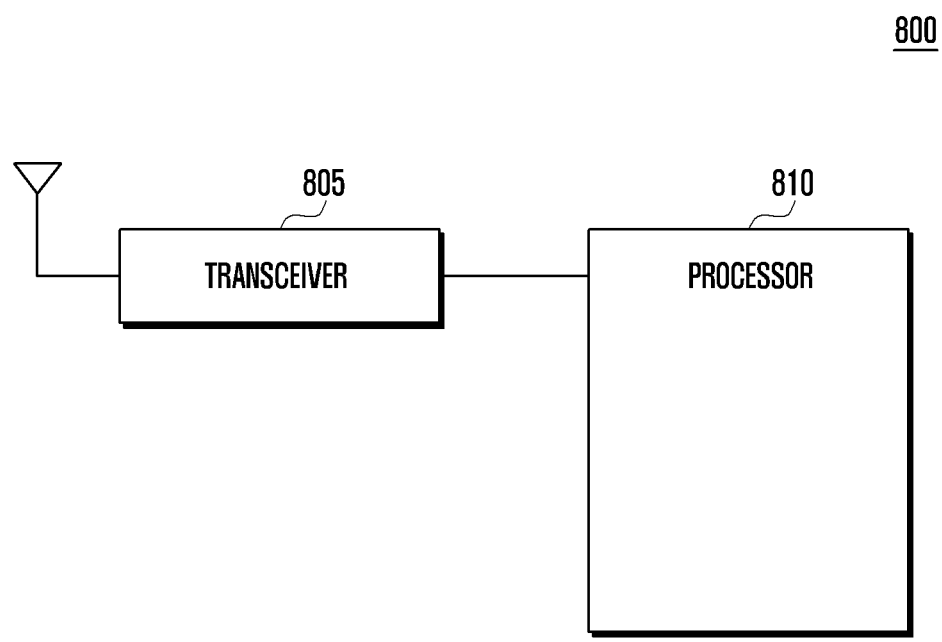
FIG. 8 is a block diagram illustrating a schematic configuration of an eNB according to an embodiment of the present invention.

FIG. 8 is a block diagram illustrating a schematic configuration of an eNB supporting carrier aggregation according to an embodiment of the present invention.

The eNB 800 may include a transceiver 805 and at least one processor 810.

The transceiver 805 may communicate signals with a D2D UE under the control of the processor 810.

For example, the processor 810 may control the transceiver 805 to broadcast the information on the uplink resources or uplink resource pools available for D2D communication using an SIB that is received by the D2D UEs located in the cell of the eNB 800. The processor 810 may also notify a D2D Tx UE of the data transmission resources or data transmission resource pool by means of the transceiver 805.

The processor 810 may control the transceiver 805 to transmit an indicator for indicating the type of D2D service per carrier or the carrier with priority for multicarrier operation to a D2D UE supporting the multicarrier operation.

If the eNB allocates cellular data transmission resources at a time outside the D2D data transmission period in response to a cellular communication scheduling request from a UE, the processor 810 may control the transceiver 805 to notify the UE of this resource allocation.

The processor 810 may transmit per-carrier transmission power information generated based on the priorities or types of D2D communication services to the D2D UE supporting the multicarrier operation.

The above-described operations of the eNB or the UE may be realized in such a way of installing a memory device storing corresponding program codes in an arbitrary component of the eNB or the UE. That is, the control unit of the eNB or the UE may perform the above described operations by reading the program codes from the memory device and executing them by means of a processor or a Central Processing Unit (CPU).

The various components and modules constituting an entity, an eNB, or a UE described herein may be enabled and operated using hardware circuitry such as complementary metal oxide semiconductor-based logic circuitry, firmware, software, or any combination of hardware, firmware, and software embodied in a machine-readable medium. For example, various electrical structures and methods may be embodied using transistors, logic gates, and electrical circuits such as application-specific integrated circuits.

Although the description has been made with reference to particular embodiments, the present invention can be implemented with various modifications without departing from the scope of the present invention. Thus, the present invention is not limited to the particular embodiments disclosed, and it will include the following claims and their equivalents.

The invention claimed is:

1. A communication method of a terminal in a wireless communication system supporting carrier aggregation, the method comprising:

checking a data transmission based on a cellular communication and a data transmission based on a device-to-device (D2D) communication on different carriers;
reducing transmission power for the D2D communication-based data transmission to a predetermined level; and
recovering, if the cellular communication-based data transmission is absent during a predetermined period, the reduction in transmission power for the D2D communication-based data transmission.

2. The method of claim 1, wherein recovering the reduction in transmission power comprises recovering, if a scheduling request for cellular communication-based data transmission is not transmitted, the reduction in transmission power for the D2D communication-based data transmission.

3. The method of claim 1, wherein recovering the reduction in transmission power comprises recovering, if the terminal is scheduled with resources allocated for the cellular communication-based data transmission at a time outside a data transmission period for the D2D communication, the reduction in transmission power for the D2D communication-based data transmission.

4. The method of claim 1, wherein recovering the reduction in transmission power comprises recovering, if a signal indicating resource allocation for cellular communication-based data transmission at a time outside a data transmission period for the D2D communication is received from a base station, the reduction in transmission power for the D2D communication-based data transmission.

5. The method of claim 1, further comprising:
determining, if the D2D communication-based data transmission does not follow uplink time adjustment (TA) of the cellular communication, whether a difference between the data transmissions for the cellular and D2D communications is equal to or greater than a predetermined time; and
holding, if the difference between the data transmissions is equal to or greater than the predetermined time, the D2D communication-based data transmission.

6. The method of claim 1, further comprising:
determining, if the D2D communication-based data transmission does not follow uplink time adjustment (TA) for the cellular communication, whether the terminal supports use of multiple TAs; and
holding, if the terminal does not support use of multiple TAs, the D2D communication-based data transmission.

7. The method of claim 1, wherein reducing the transmission power for the D2D communication-based data transmission to the predetermined level comprises determining the transmission power for the D2D communication-based data transmission in consideration of a transmission power allocated for cellular communication-based data transmission in a total transmission power.

8. A terminal in a wireless communication system supporting carrier aggregation, the terminal comprising:
a transceiver for transmitting and receiving signals; and
at least one processor which checks a data transmission based on a cellular communication and a data transmission based on a device-to-device (D2D) communication on different carriers, reduces transmission power for the D2D communication-based data transmission to a predetermined level, and recovers, if the cellular communication-based data transmission is absent during a predetermined period, the reduction in transmission power for the D2D communication-based data transmission.

9. The terminal of claim 8, wherein the at least one processor recovers, if a scheduling request for cellular communication-based data transmission is not transmitted, the reduction in transmission power for the D2D communication-based data transmission.

10. The terminal of claim 8, wherein the at least one processor recovers, if the terminal is scheduled with resources allocated for the cellular communication-based data transmission at a time outside a data transmission period for the D2D communication, the reduction in transmission power for the D2D communication-based data transmission.

11. The terminal of claim 8, wherein the at least one processor recovers, if a signal indicating resource allocation for cellular communication-based data transmission at a time outside a data transmission period for the D2D communication is received from a base station, the reduction in transmission power for the D2D communication-based data transmission.

12. The terminal of claim 8, wherein the at least one processor determines, if the D2D communication-based data transmission does not follow uplink time adjustment (TA) of the cellular communication, whether a difference between the data transmissions for the cellular and D2D communications is equal to or greater than a predetermined time and holds, if the difference between the data transmissions is equal to or greater than the predetermined time, the D2D communication-based data transmission.

13. The terminal of claim 8, wherein the at least one processor determines, if the D2D communication-based data transmission does not follow uplink time adjustment (TA) for the cellular communication, whether the terminal supports use of multiple TAs and holds, if the terminal does not support use of multiple TAs, the D2D communication-based data transmission.

14. The terminal of claim 8, wherein the at least one processor determines the transmission power for the D2D communication-based data transmission in consideration of a transmission power allocated for cellular communication-based data transmission in a total transmission power.

* * * * *